(12) United States Patent
Tsurumi et al.

(10) Patent No.: US 10,100,691 B2
(45) Date of Patent: Oct. 16, 2018

(54) ELECTRICALLY HEATED CATALYST

(71) Applicant: TOYOTA JIDOSHA KABUSHIKI KAISHA, Toyota-shi, Aichi-ken (JP)

(72) Inventors: Kazuki Tsurumi, Susono (JP); Hiroshi Tanaka, Susono (JP); Shigemasa Hirooka, Susono (JP); Shingo Korenaga, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 70 days.

(21) Appl. No.: 15/423,867

(22) Filed: Feb. 3, 2017

(65) Prior Publication Data

US 2017/0226910 A1 Aug. 10, 2017

(30) Foreign Application Priority Data

Feb. 5, 2016 (JP) .................. 2016-020949

(51) Int. Cl.
*F01N 3/20* (2006.01)
*B01D 53/94* (2006.01)
*B01J 23/38* (2006.01)
*B01J 35/04* (2006.01)
(Continued)

(52) U.S. Cl.
CPC ....... *F01N 3/2026* (2013.01); *B01D 53/9477* (2013.01); *B01J 23/38* (2013.01); *B01J 35/04* (2013.01); *F01N 3/281* (2013.01); *F01N 13/0097* (2014.06); *B01D 2255/10* (2013.01); *B01D 2255/1021* (2013.01); *B01D 2255/1023* (2013.01); *B01D 2255/1025* (2013.01); *B01D 2255/2065* (2013.01); *B01D 2255/2092* (2013.01); *B01D 2255/904* (2013.01); *B01D 2255/908* (2013.01); *B01D 2255/9032* (2013.01); *F01N 2510/068* (2013.01); *F01N 2570/16* (2013.01); *Y02T 10/26* (2013.01)

(58) Field of Classification Search
None
See application file for complete search history.

(56) References Cited

FOREIGN PATENT DOCUMENTS

JP    2009-275559 A    11/2009
JP    2010-203419 A    9/2010
(Continued)

OTHER PUBLICATIONS

Sofue et al. (JP 2010203419A)—translated document (Year: 2010).*

*Primary Examiner* — Walter D. Griffin
*Assistant Examiner* — Jelitza M Perez
(74) *Attorney, Agent, or Firm* — Hunton Andrews Kurth LLP

(57) ABSTRACT

In an EHC, a ratio of a heat capacity of the second catalyst body with respect to a heat capacity of the first catalyst body is made within a range of 0.67-1.5. A ratio of an amount of coat of an OSC material in the second catalyst body with respect to an amount of coat of an OSC material in the first catalyst body is made larger than the ratio of the heat capacity of the second catalyst body with respect to the heat capacity of the first catalyst body. A ratio of an amount of support of a noble metal in the second catalyst body with respect to an amount of support of a noble metal in the first catalyst body is made smaller than the ratio of the heat capacity of the second catalyst body with respect to the heat capacity of the first catalyst body.

4 Claims, 5 Drawing Sheets

(51) Int. Cl.
*F01N 3/28* (2006.01)
*F01N 13/00* (2010.01)

(56) References Cited

FOREIGN PATENT DOCUMENTS

| | | | |
|---|---|---|---|
| JP | 2010203419 A | * | 9/2010 |
| JP | 2014-001704 A | | 1/2014 |

* cited by examiner

ELECTRICALLY HEATED CATALYST

This application claims the benefit of Japanese Patent Application No. 2016-020949, filed on Feb. 5, 2016, which is hereby incorporated by reference herein in its entirety.

TECHNICAL FIELD

The present disclosure relates to an electrically heated catalyst that is arranged in an exhaust passage of an internal combustion engine.

DESCRIPTION OF THE RELATED ART

In the past, as an exhaust gas purification apparatus arranged in an exhaust passage of an internal combustion engine, there has been developed an electrically heated catalyst (hereinafter, may also be referred to as an EHC) which has a catalyst body with a catalyst supported by a substrate which generates heat by electrical energization thereof. In this EHC, the catalyst supported by the substrate can be heated by supplying electric power to the substrate of the catalyst body. For that reason, the catalyst body can be made to rise in temperature so as to be activated by electrical energization, before starting of the internal combustion engine.

In a first patent literature, there is disclosed an EHC which is constructed in such a manner that a first catalyst body to be heated by the supply of electric power (electrical energization) and a second catalyst body arranged at the downstream side of the first catalyst body are received in the same case. In addition, this first patent literature discloses that the heat capacity of the second catalyst body is made larger than the heat capacity of the first catalyst body. Moreover, this first patent literature also discloses that the volume ratio of the first catalyst body and the second catalyst body is made within a range of 1:1-1:3.

CITATION LIST

Patent Literature

First Patent Literature: Japanese patent laid-open publication No. 2010-203419

SUMMARY

Technical Problem

The embodiments of the present disclosure may provide a technology in which required exhaust gas purification performance can be exhibited in a more suitable manner, in an EHC which is constructed such that a first catalyst body and a second catalyst body arranged at the downstream side of the first catalyst body are received in the same case, with a substrate of the first catalyst body generating heat by being electrically energized.

Solution to Problem

An electrically heated catalyst according to the present disclosure is arranged in an exhaust passage of an internal combustion engine, and is constructed such that a first catalyst body and a second catalyst body, each of which is formed by coating on a substrate an OSC material which is a coating material having an oxygen retaining capacity, and by supporting a noble metal on the substrate, are received in the same case, in which said second catalyst body is arranged at the downstream side of said first catalyst body and the substrate of said first catalyst body is electrically energized to generate heat, wherein a ratio of a heat capacity of said second catalyst body with respect to a heat capacity of said first catalyst body may be within a range of 0.67-1.5; and a ratio of an amount of coat of the OSC material in said second catalyst body with respect to an amount of coat of the OSC material in said first catalyst body may be larger than the ratio of the heat capacity of said second catalyst body with respect to the heat capacity of said first catalyst body; and a ratio of an amount of support of the noble metal in said second catalyst body with respect to an amount of support of the noble metal in said first catalyst body may be smaller than the ratio of the heat capacity of said second catalyst body with respect to the heat capacity of said first catalyst body.

The EHC according to the present disclosure has the first catalyst body and the second catalyst body which are received in the same case. The first catalyst body and the second catalyst body are each formed in such a manner that the OSC material is coated on the substrate, and the noble metal is supported by the substrate. In addition, in the inside of the case, the second catalyst body is arranged at the downstream side of the first catalyst body. Then, the substrate of the first catalyst body is supplied with electric power (i.e., electrically energized) to generate heat. In the EHC of such an arrangement, a total volume of the first catalyst body and the second catalyst body, a total amount of coat of the OSC materials, and a total amount of support of the noble metals as a whole are decided based on the exhaust gas purification performance required to the EHC.

Then, in the EHC, by raising the temperature of the first catalyst body by means of electrical energization immediately before the starting of the internal combustion engine, it is possible to put the first catalyst body into a state where the temperature thereof has become equal to or higher than a required temperature (i.e., a temperature at which a desired exhaust gas purification (reduction) rate can be achieved), at the time when the internal combustion engine is started. As a result of this, even when it is immediately after the starting of the internal combustion engine and at the same time is before the temperature of the second catalyst body reaches the required temperature, it is possible to ensure the desired exhaust gas purification rate by means of only the first catalyst body, as long as the temperature of the first catalyst body is maintained at the required temperature or above.

However, when the supply of electric power to the first catalyst body (i.e., the electrical energization to the substrate thereof) is stopped at the time of starting of the internal combustion engine, heat is carried away from the first catalyst body by exhaust gas. In addition, when the volume of the first catalyst body is small, the amount of heat obtained by the reaction of exhaust gas components in the first catalyst body after the starting of the internal combustion engine will become small. For these reasons, the smaller the volume of the first catalyst body, and the smaller the heat capacity thereof, the more quickly the temperature of the first catalyst body is easy to drop after the starting of the internal combustion engine. In addition, the heat carried away from the first catalyst body will be collected by the second catalyst body so as to be used for the temperature rise of the second catalyst body. However, when the ratio of the heat capacity of the second catalyst body with respect to the heat capacity of the first catalyst body is larger than a value in the vicinity of equivalence (i.e., 1:1), the amount of heat may be insufficient for raising the second catalyst body to the required temperature, even if the amount of heat carried away from the first catalyst body by the exhaust gas is collected by the second catalyst body after the starting of the internal combustion engine. In this case, there is a fear that the temperature of the first catalyst body may go down from the required temperature, before the temperature of the second catalyst body goes up to the required temperature or above. In other words, there may occur a situation in which the temperatures of the first catalyst body and the second catalyst body are each less than the required temperature. When such a situation occurs, the EHC will become difficult to exhibit the required exhaust gas purification performance.

On the other hand, the larger the volume of the first catalyst body, and the larger the heat capacity thereof, the more becomes the electric energy required to be supplied to the first catalyst body in order to raise the temperature of the first catalyst body to the required temperature or above by means of electrical energization. In addition, when the ratio of the heat capacity of the second catalyst body with respect to the heat capacity of the first catalyst body is smaller than the value in the vicinity of equivalence, the amount of heat carried away from the first catalyst body by the exhaust gas may not be able to be fully collected by the second catalyst body after the starting of the internal combustion engine. In this case, a part of the amount of heat carried away from the first catalyst body will be released uselessly. When such a situation occurs, it will become difficult to sufficiently utilize the energy supplied to the first catalyst body as electric power before the starting of the internal combustion engine for exhaust gas purification or reduction in the entire EHC after the starting of the internal combustion engine.

Accordingly, the EHC according to the present disclosure is configured in such a manner that the ratio between the heat capacity of the first catalyst body and the heat capacity of the second catalyst body may become in the vicinity of equivalence (i.e., 1:1). Specifically, the EHC according to the present disclosure may be configured such that the ratio of the heat capacity of the second catalyst body with respect to the heat capacity of the first catalyst body becomes within a range of 0.67-1.5. According to this, the heat capacity of the first catalyst body can be suppressed from becoming too small. Then, after the starting of the internal combustion engine, the amount of heat carried away from the first catalyst body by the exhaust gas is supplied to the second catalyst body, so that the temperature of the second catalyst body becomes easy to be raised to the required temperature or above. For that reason, the second catalyst body becomes easy to be raised to the required temperature, before the temperature of the first catalyst body drops from the required temperature. In other words, it becomes difficult for a situation to occur in which the temperatures of the first catalyst body and the second catalyst body are each less than the required temperature. In addition, the heat capacity of the first catalyst body is also suppressed from becoming too large. Then, it becomes possible to collect the most amount of heat carried away from the first catalyst body by means of the second catalyst body. In other words, the amount of heat carried away from the first catalyst body can be suppressed from being released uselessly. Accordingly, the energy supplied to the first catalyst body as electric power before the starting of the internal combustion engine can be utilized more efficiently for exhaust gas purification or reduction in the entire EHC after the starting of the internal combustion engine.

In addition, in each of the first catalyst body and the second catalyst body, the OSC material, which is a coating material having an oxygen retaining capacity, is coated thereon. Then, in each of the first catalyst body and the second catalyst body, not only the substrate but also the OSC material has a certain amount of heat capacity. For that reason, the ratio between the heat capacity of the first catalyst body and the heat capacity of the second catalyst body becomes the ratio between the heat capacities of the substrate and the OSC material of the first catalyst body and those of the second catalyst body. Then, in general, the ratio of the amount of coat of the OSC material in the second catalyst body with respect to the amount of coat of the OSC material in the first catalyst body becomes equal to the ratio of the heat capacity of the second catalyst body with respect to the heat capacity of the first catalyst body. However, in the EHC according to the present disclosure, as mentioned above, the ratio of the heat capacity of said second catalyst body with respect to the heat capacity of said first catalyst body may be made within the range of 0.67-1.5, and at the same time, the ratio of the amount of coat of the OSC material in the second catalyst body with respect to the amount of coat of the OSC material in the first catalyst body may be made larger than the ratio of the heat capacity of the second catalyst body with respect to the heat capacity of the first catalyst body.

According to this, the volume of the substrate of the first catalyst body will be made larger, while maintaining the heat capacity of the first catalyst body, in comparison with the case where the ratio of the amount of coat of the OSC material in the second catalyst body with respect to the amount of coat of the OSC material in the first catalyst body is made equal to the ratio of the heat capacity of the second catalyst body with respect to the heat capacity of the first catalyst body. For that reason, the amount of heat obtained by the reaction of the exhaust gas components increases in the first catalyst body which is in a state where the required temperature has been reached, immediately after the starting of the internal combustion engine. As a result of this, even if the supply of electric power (electrical energization) to the first catalyst body is stopped at the time when the internal combustion engine is started, the temperature of the first catalyst body becomes difficult to drop due to the heat of reaction generated in the first catalyst body after that. Accordingly, the state where the temperature of the first catalyst body is equal to or higher than the required temperature after the starting of the internal combustion engine becomes easy to be maintained for a longer period of time. For that reason, it becomes more difficult for the situation to occur in which the temperatures of the first catalyst body and the second catalyst body are each less than the required temperature.

In addition, the ratio of the amount of support of the noble metal in the second catalyst body with respect to the amount of support of the noble metal in the first catalyst body generally becomes equal to the ratio of the amount of coat of the OSC material in the second catalyst body with respect to the amount of coat of the OSC material in the first catalyst body. However, as mentioned above, in the EHC, it is required to ensure the desired exhaust gas purification rate only by the first catalyst body until the temperature of the second catalyst body reaches the required temperature, immediately after the starting of the internal combustion engine. Moreover, in the EHC, the first catalyst body is arranged at the upstream side of the second catalyst body, therefore deterioration is easier to progress in the first catalyst body, in comparison with the second catalyst body. Accordingly, in the EHC according to the present disclosure, as mentioned above, the ratio of the heat capacity of said second catalyst body with respect to the heat capacity of said first catalyst body may be made within the range of 0.67-1.5, and at the same time, the ratio of the amount of support of the noble metal in the second catalyst body with respect to the amount of support of the noble metal in the first catalyst body may be made smaller than the ratio of the heat capacity of the second catalyst body with respect to the heat capacity of the first catalyst body, contrary to the ratio of the amount of coat of the OSC material in the second catalyst body with respect to the amount of coat of the OSC material in the first catalyst body.

According to this, the exhaust gas purification performance of the first catalyst body alone can be made higher, while maintaining the heat capacity of the first catalyst body, in comparison with the case where the ratio of the amount of support of the noble metal in the second catalyst body with respect to the amount of support of the noble metal in the first catalyst body is made equal to the ratio of the heat capacity of the second catalyst body with respect to the heat capacity of the first catalyst body. For that reason, in a situation where it is immediately after the starting of the internal combustion engine and it is required to ensure the desired exhaust gas purification rate only by the first catalyst body, it becomes easier to ensure said desired exhaust gas purification rate. In addition, even in cases where deterioration of the first catalyst body with time has progressed, it becomes easy to ensure the desired exhaust gas purification rate.

As explained above, in the EHC, by setting the ratio of heat capacities, the ratio of the amounts of coat of the OSC materials, and the ratio of the amounts of support of the noble metals, in the first catalyst body and the second catalyst body, as mentioned above, the exhaust gas purification (reduction) performance required to the EHC can be exhibited in a more suitable manner.

Here, note that in the present disclosure, the ratio of the amount of coat of the OSC material in the second catalyst body with respect to the amount of coat of the OSC material in the first catalyst body may be set within a range of 1.2-3, while being made larger than the ratio of the heat capacity of the second catalyst body with respect to the heat capacity of the first catalyst body. Here, a maximum value of the range of the ratio of the heat capacity of the second catalyst body with respect to the heat capacity of the first catalyst body is 1.5. Accordingly, the ratio of the amount of coat of the OSC material in the second catalyst body with respect to the amount of coat of the OSC material in the first catalyst body may be set within a range of 1.6-3. In addition, the ratio of the amount of support of the noble metal in the second catalyst body with respect to the amount of support of the noble metal in the first catalyst body may be set within a range of 0.4-0.8, while being made smaller than the ratio of the heat capacity of the second catalyst body with respect to the heat capacity of the first catalyst body. Here, a minimum value of the range of the ratio of the heat capacity of the second catalyst body with respect to the heat capacity of the first catalyst body is 0.67. Accordingly, the ratio of the amount of support of the noble metal in the second catalyst body with respect to the amount of support of the noble metal in the first catalyst body may be set within a range of 0.4-0.66.

According to the present disclosure, required exhaust gas purification (reduction) performance can be exhibited in a more suitable manner, in an EHC which is constructed such that a first catalyst body and a second catalyst body arranged at the downstream side of the first catalyst body are received in the same case, with a substrate of the first catalyst body generating heat by being electrically energized.

Further features of the present disclosure will become apparent from the following description of exemplary embodiments with reference to the attached drawings.

DESCRIPTION OF EMBODIMENTS

Hereinafter, a specific embodiment of the present disclosure will be described based on the attached drawings. However, the dimensions, materials, shapes, relative arrangements and so on of component parts described in the embodiment are not intended to limit the technical scope of the present disclosure to these alone in particular as long as there are no specific statements.

First Embodiment (Schematic Construction)

Figure 1:
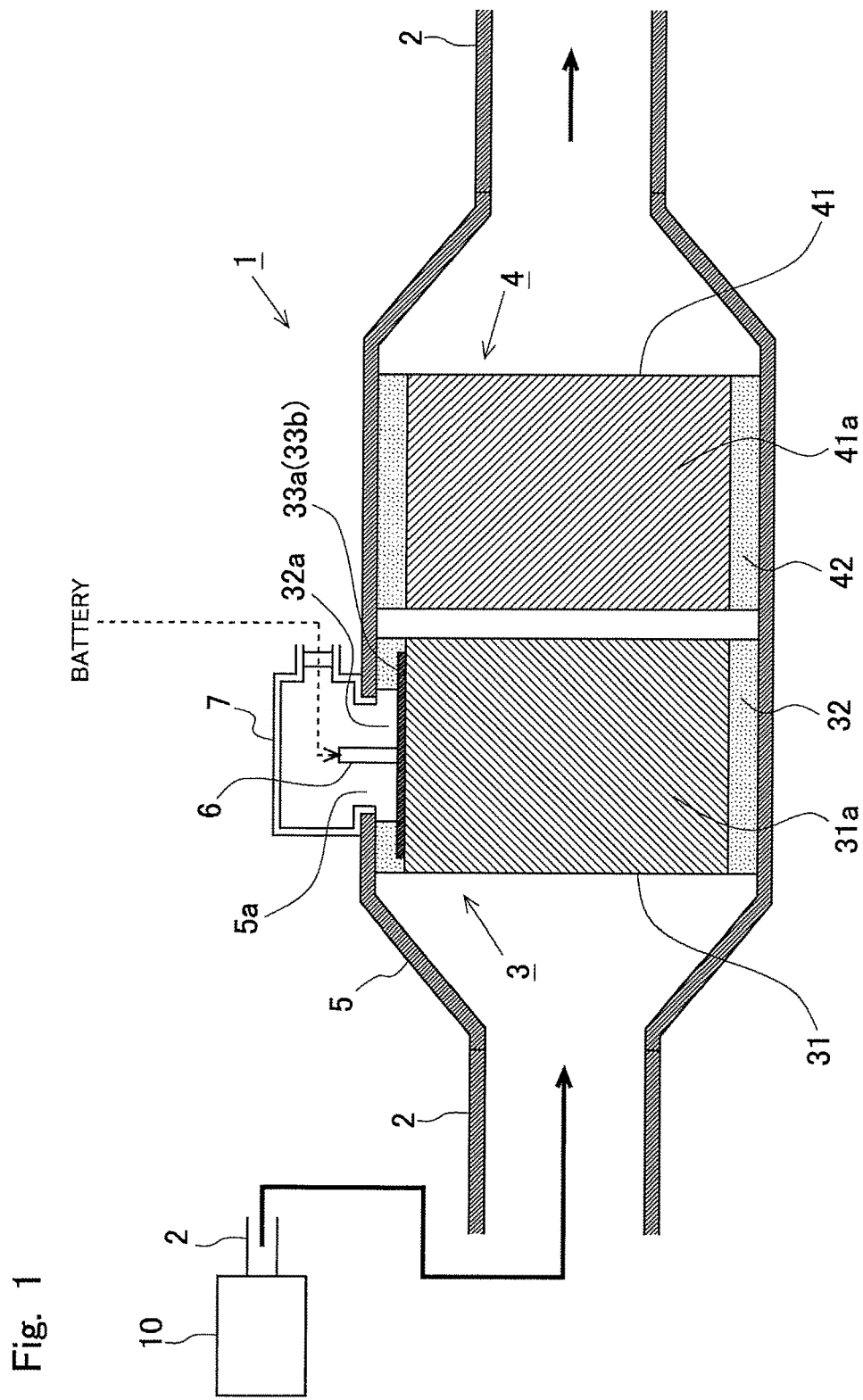
FIG. 1 is a view showing the schematic construction of an EHC according to embodiments of the present disclosure.
Figure 2:
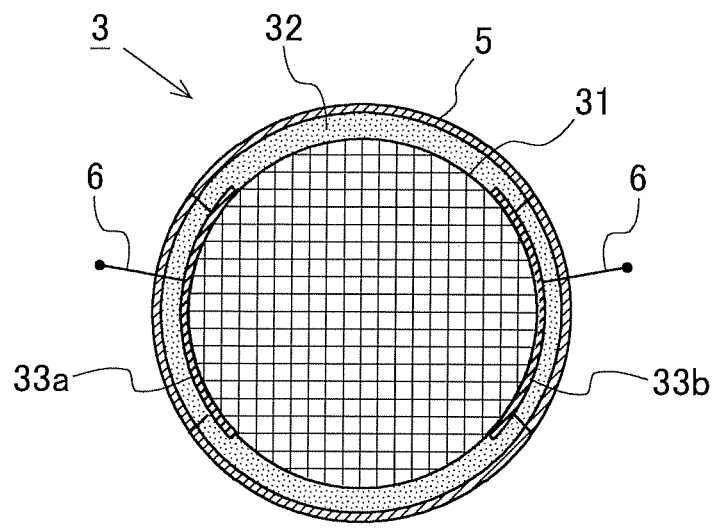
FIG. 2 is a view showing the schematic construction of a first catalyst body in the EHC according to the embodiments of the present disclosure.

First, the schematic construction of an EHC according to this embodiment will be explained based on FIGS. 1 and 2. FIG. 1 is a view showing the schematic construction of the EHC according to this embodiment. Thick solid line arrows indicate the flows of exhaust gas. FIG. 2 is a view showing the schematic construction of a first catalyst body in the EHC according to this embodiment. FIG. 2 shows the cross section of the first catalyst body in a direction perpendicular to a direction in which exhaust gas flows.

The EHC denoted by 1 according to this embodiment is arranged in an exhaust pipe 2 of an internal combustion engine 10 which constitutes a hybrid system having an internal combustion engine and an electric motor as drive sources of a vehicle. However, the internal combustion engine to which the EHC according to the present disclosure is applied is not necessarily limited to one which constitutes the hybrid system.

The EHC 1 is provided with the first catalyst body denoted by 3 and a second catalyst body 4. The first catalyst body 3 and the second catalyst body 4 are received in one and the same case 5. In the inside of the case 5, the second catalyst body 4 is arranged at the downstream side of the first catalyst body 3. The first catalyst body 3 has a first substrate 31, and the second catalyst body 4 has a second substrate 41. Each of the substrates 31, 41 has a plurality of cells extending in the direction in which the exhaust gas flows, and the cross section of each substrate in the direction perpendicular to the direction in which the exhaust gas flows is formed in a honeycomb shape. Then, an OSC material to be described later is coated on, and a noble metal is supported by, partition walls which form the cells in each of the substrates 31, 41 through which the exhaust gas flows.

On each of the substrates 31, 41 of the first and second catalyst bodies 3, 4, the OSC material, which is a coating material having an oxygen retaining capacity, is coated, and at the same time, the noble metal is supported, wherein the OSC material and the noble metal act as catalyst components. Here, as a component contained in the OSC material, there can be mentioned, by way of example, ceria ($CeO_2$) and alumina ($Al_2O_3$). In addition, as the noble metal, there can also be mentioned, by way of example, platinum (Pt), rhodium (Rh), and palladium (Pd).

The case 5 is formed of metal. As a material forming the case 5, there can be mentioned a stainless steel material, for example. The case 5 has an inner wall surface coated with glass which is an electrically insulating material. Then, a mat member 32 is inserted between the inner wall surface of the case 5 and an outer peripheral surface of the first substrate 31. In addition, another mat member 42 is inserted between the inner wall surface of the case 5 and an outer peripheral surface of the second substrate 41. In other words, in the inside of the case 5, the first substrate 31 is supported by the mat member 32, and the second substrate 41 is supported by the mat member 42. The mat members 32, 42 are each formed of an electrically insulating material. As a material forming the mat members 32, 42, there can be mentioned, by way of example, a ceramic fiber which includes alumina as a main component.

The first substrate 31 of the first catalyst body 3 is formed of a material which, when electrically energized, becomes an electric resistance thereby to generate heat. As a material forming the first substrate the 31, there can be mentioned SiC, for example. A pair of electrodes 33a, 33b are connected to a side surface of the first substrate 31. The electrodes 33a, 33b each extend along the outer peripheral surface of the first substrate 31 in a circumferential direction and in an axial direction. Then, the electrode 33a and the electrode 33b are arranged in opposition to each other on the opposite sides of the first substrate 31. Metal foils 6 are connected to the electrodes 33a, 33b, respectively. Each of the metal foils 6 passes through a through hole 32a formed in the mat member 32, and another through hole 5a formed in the case 5, so that it protrudes to the outside of the case 5. Each of the through holes 5a in the case 5 is enclosed with an electrode cover 7. For that reason, each of the metal foils 6 is in a state protruding into the electrode cover 7. Power cables (not shown) are inserted through the electrode covers 7, respectively. Then, the metal foils 6 are connected to the power cables in the insides of the electrode cover 7. When electrically energizing the first substrate 31, electric current flows to the electrodes 33a, 33b through the power cables and the metal foils 6 from a battery.

In addition, in the EHC 1, a total volume of the first catalyst body 3 and the second catalyst body 4, a total amount of coat of the OSC materials, and a total amount of support of the noble metals as a whole are set based on the exhaust gas purification (reduction) performance required to the EHC 1. For that reason, the first catalyst body 3 and the second catalyst body 4 are in a relation such that when the volume of one of them increases, the volume of the other decreases, and accordingly, when the heat capacity of the one increases, the heat capacity of the other basically decreases. Moreover, the first catalyst body 3 and the second catalyst body 4 are also in a relation such that when the amount of coat of the OSC material of one of them increases, the amount of coat of the OSC material of the other decreases. Further, the first catalyst body 3 and the second catalyst body 4 are also in a relation such that when the amount of support of the noble metal of one of them increases, the amount of support of the noble metal of the other decreases. In view of the above, in this embodiment, in order for the EHC 1 to exhibit the required exhaust gas purification (reduction) performance in a more suitable manner, while maintaining the total volume, the total amount of coat of the OSC materials, and the total amount of support of the noble metals, in the first catalyst body 3 and the second catalyst body 4 as a whole at predetermined set amounts, respectively, the ratio of heat capacities, the ratio of the amounts of coat of the OSC materials, and the ratio of the amounts of support of the noble metals, in the first catalyst body 3 and the second catalyst body 4, are set as follows.

(Ratio of Heat Capacities)

Figure 3:
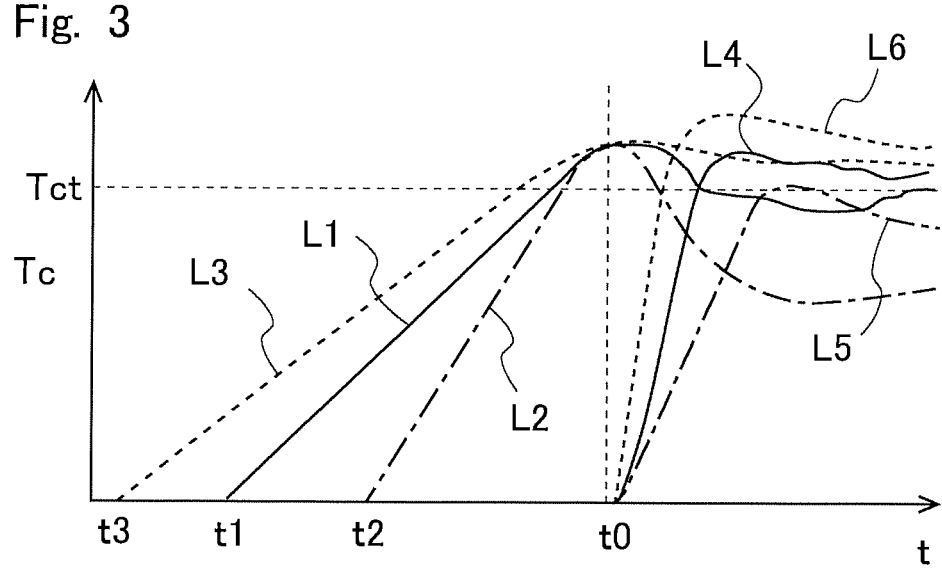
FIG. 3 is a view showing the changes over time of the temperature of the first catalyst body and the temperature of a second catalyst body before and after starting of an internal combustion engine in which the EHC is arranged in an exhaust pipe, according to the embodiments of the present disclosure.

Here, the ratio between the heat capacities of the first catalyst body 3 and the second catalyst body 4 will be explained based on FIG. 3. FIG. 3 is a view showing the changes over time of the temperatures of the first catalyst body 3 and the second catalyst body 4 before and after the starting of the internal combustion engine 10 in which the EHC 1 is arranged in the exhaust pipe 2. In FIG. 3, the axis of ordinate represents the temperatures Tc of the catalyst bodies, and the axis of abscissa represents time t. In addition, in FIG. 3, lines L1 through L3 indicate the changes over time of the temperature of the first catalyst body 3, and lines L4 through L6 indicate the changes over time of the temperature of the second catalyst body 4. The line L1 and the line L4 indicate the changes over time of the temperatures of the individual catalyst bodies 3, 4 in the case where the ratio between the heat capacity of the first catalyst body 3 and the heat capacity of the second catalyst body 4 is in the vicinity of equivalence (i.e., 1:1). The line L2 and the line L5 indicate the changes over time of the temperatures of the individual catalyst bodies 3, 4 in the case where the ratio of the heat capacity of the second catalyst body 4 with respect to the heat capacity of the first catalyst body 3 is larger than the vicinity of equivalence. The line L3 and the line L6 indicate the changes over time of the temperatures of the individual catalyst bodies 3, 4 in the case where the ratio of the heat capacity of the second catalyst body 4 with respect to the heat capacity of the first catalyst body 3 is smaller than the vicinity of equivalence.

In addition, t0 in the axis of abscissa of FIG. 3 represents a point in time at which the internal combustion engine 10 is started. t1, t2, and t3 in the axis of abscissa of FIG. 3 respectively represent energization start points in time at which electric power is started to be supplied to the first catalyst body 3. Moreover, Tct in the axis of ordinate of FIG. 3 represents the required temperature to the first catalyst body 3 and the second catalyst body 4 (i.e., a temperature at which a desired exhaust gas purification (reduction) rate can be achieved).

In the EHC 1, the temperature of the first catalyst body 3 can be raised by electrical energization thereof (i.e., electrical energization to the first substrate 31) before the starting of the internal combustion engine 10. For that reason, as shown in FIG. 3, by raising the temperature of the first catalyst body 3 by means of electrical energization thereof immediately before the starting of the internal combustion engine 10, it is possible to put the first catalyst body 3 into a state where the temperature thereof has become equal to or higher than a required temperature Tct, at the time when the internal combustion engine 10 is started (t0 in FIG. 3). However, thermal or heat energy is not supplied to the second catalyst body 4, before the starting of the internal combustion engine 10. For that reason, after the internal combustion engine 10 is started, the temperature of the second catalyst body 4 begins to rise due to the heat being supplied thereto from the exhaust gas which has passed through the first catalyst body 3 and has flowed into the second catalyst body 4. However, if the temperature of the first catalyst body 3 becomes equal to or higher than the required temperature Tct at the time of starting of the internal combustion engine 10, it is possible to ensure the desired exhaust gas purification rate by means of only the first catalyst body 3, as long as the temperature of the first catalyst body 3 is maintained at the required temperature Tct or above, even when it is immediately after the starting of the internal combustion engine 10 and at the same time is before the temperature of the second catalyst body 4 reaches the required temperature Tct.

Then, when the temperature of the exhaust gas goes up after the starting of the internal combustion engine 10, the thermal energy of the exhaust gas will be supplied to the first catalyst body 3 and the second catalyst body 4. For that reason, the electrical energization to the first catalyst body 3 is stopped at the time when the internal combustion engine 10 is started (i.e., the electrical energization to the first catalyst body 3 is stopped at the point in time of t0 in FIG. 3). However, in general, the temperature of the exhaust gas is low immediately after the starting of the internal combustion engine 10, so that heat will be carried away from the first catalyst body 3 by the exhaust gas. Here, the smaller the volume of the first catalyst body 3, and the smaller the heat capacity thereof, the more quickly the temperature of the first catalyst body 3 rises at the time when electric power is supplied thereto (electrical energization). For that reason, the electric energy required in order to raise the temperature of the first catalyst body 3 to the required temperature Tct or higher by means of electrical energization thereof becomes small. On the other hand, when the volume of the first catalyst body 3 is small, the surface area of the first catalyst body 3 in contact with the exhaust gas components in the exhaust gas becomes small, the amount of heat obtained by the reaction of exhaust gas components in the first catalyst body 3 after the starting of the internal combustion engine 10 becomes small. For these reasons, the smaller the volume of the first catalyst body 3, and the smaller the heat capacity of the first catalyst body 3, the more quickly the temperature of the first catalyst body 3 is easy to drop, when heat is carried away by the exhaust gas after the starting of the internal combustion engine 10. Accordingly, when the ratio of the heat capacity of the second catalyst body 4 with respect to the heat capacity of the first catalyst body 3 is larger than the vicinity of equivalence (1:1), the heat capacity of the first catalyst body 3 becomes small, so that the temperature of the first catalyst body 3 will drop quickly after the starting of the internal combustion engine 10, as shown by the line L2 in FIG. 3.

Moreover, after the starting of the internal combustion engine 10, the heat carried away from the first catalyst body 3 will be collected by the second catalyst body 4 so as to be used for the temperature rise of the second catalyst body 4. However, when the ratio of the heat capacity of the second catalyst body 4 with respect to the heat capacity of the first catalyst body 3 is larger than the vicinity of equivalence, the amount of heat may be insufficient for raising the second catalyst body 4 to the required temperature, even if the amount of heat carried away from the first catalyst body 3 by the exhaust gas is collected by the second catalyst body 4 after the starting of the internal combustion engine 10. For that reason, when the ratio of the heat capacity of the second catalyst body 4 with respect to the heat capacity of the first catalyst body 3 is larger than the vicinity of equivalence, as shown by the lines L2, L5 in FIG. 3, after the starting of the internal combustion engine 10, the temperature of the first catalyst body 3 may go down from the required temperature Tct, before the temperature of the second catalyst body 4 goes up to the required temperature Tct or above. In other words, there may occur a situation in which the temperatures of the first catalyst body 3 and the second catalyst body 4 are each less than the required temperature Tct. When such a situation occurs, the EHC 1 will become difficult to exhibit the required exhaust gas purification performance.

On the other hand, the larger the volume of the first catalyst body 3, and the larger the heat capacity thereof, the more becomes the electric energy required in order to raise the temperature of the first catalyst body 3 to the required temperature Tct or above by means of electrical energization thereof. For that reason, when the ratio of the heat capacity of the second catalyst body 4 with respect to the heat capacity of the first catalyst body 3 is smaller than the vicinity of equivalence, the heat capacity of the first catalyst body 3 becomes large, and hence, it becomes necessary to make the energization start point in time (t3) before the starting of the internal combustion engine 10 more early, thereby increasing the electric energy to be supplied to the first catalyst body 3 to a more extent, as shown by the line L3 in FIG. 3.

Further, when the ratio of the heat capacity of the second catalyst body 4 with respect to the heat capacity of the first catalyst body 3 is smaller than the vicinity of equivalence, the amount of heat carried away from the first catalyst body 3 by the exhaust gas may not be able to be fully collected by the second catalyst body 4 after the starting of the internal combustion engine 10. In this case, a part of the amount of heat carried away from the first catalyst body 3 will be released uselessly. For that reason, when the ratio of the heat capacity of the second catalyst body 4 with respect to the heat capacity of the first catalyst body 3 is smaller than the vicinity of equivalence, such a situation occurs, so that it becomes difficult to sufficiently utilize the energy supplied to the first catalyst body 3 as electric power before the starting of the internal combustion engine 10 for exhaust gas purification or reduction in the entire EHC 1 after the starting of the internal combustion engine 1.

Accordingly, the EHC 1 according to this embodiment is configured in such a manner that the ratio between the heat capacity of the first catalyst body 3 and the heat capacity of the second catalyst body 4 becomes in the vicinity of equivalence. As mentioned above, as the first catalyst body 3 and the second catalyst body 4 as a whole, the ratio between the heat capacity of the first catalyst body 3 and the heat capacity of the second catalyst body 4 is set in this manner, while maintaining a predetermined volume set based on the exhaust gas purification performance required to the EHC 1. Accordingly, it is possible to suppress the heat capacity of the first catalyst body 3 from becoming too small, in comparison with the case where the ratio of the heat capacity of the second catalyst body 4 with respect to the heat capacity of the first catalyst body 3 is larger than the vicinity of equivalence. As a result, the temperature of the first catalyst body 3 is suppressed from dropping quickly after the starting of the internal combustion engine 10. In addition, it is possible to suppress the heat capacity of the first catalyst body 3 from becoming too large, in comparison with the case where the ratio of the heat capacity of the second catalyst body 4 with respect to the heat capacity of the first catalyst body 3 is smaller than the vicinity of equivalence. For that reason, it is possible to suppress an increase in the electric energy to be supplied to the first catalyst body 3 for raising the temperature of the first catalyst body 3 to the required temperature Tct or above, before the starting of the internal combustion engine 10.

In addition, after the starting of the internal combustion engine 10, the amount of heat retained in the first catalyst body 3 is carried away by the exhaust gas and is supplied to the second catalyst body 4, so that the temperature of the second catalyst body 4 becomes easy to be raised to the required temperature Tct or above. Accordingly, it becomes difficult for a situation to occur in which the temperatures of the first catalyst body 3 and the second catalyst body 4 are each less than the required temperature Tct. Further, it becomes possible to collect the most amount of heat carried away from the first catalyst body 3 by means of the second catalyst body 4. For that reason, the amount of heat carried away from the first catalyst body 3 can be suppressed from being released uselessly. Accordingly, the energy supplied to the first catalyst body 3 as electric power before the starting of the internal combustion engine 10 can be utilized more efficiently for exhaust gas purification or reduction in the entire EHC 1 after the starting of the internal combustion engine 10.

Figure 4:
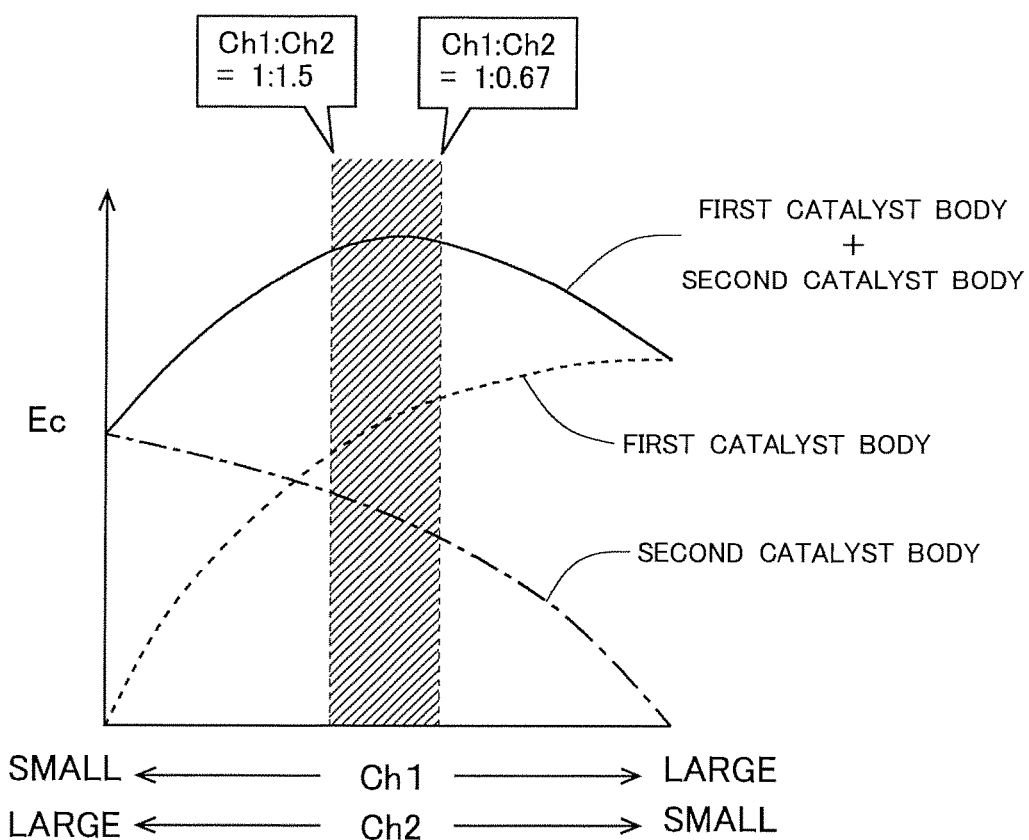
FIG. 4 is a view showing the relation between heat capacities and amounts of retained energy, in the first catalyst body and the second catalyst body, according to the embodiments of the present disclosure.

Here, a specific ratio between the heat capacity of the first catalyst body 3 and the heat capacity of the second catalyst body 4 according to this embodiment will be explained based on FIG. 4. FIG. 4 is a view showing the relation between heat capacities and amounts of retained energy, in the first catalyst body 3 and the second catalyst body 4. In FIG. 4, the axis of ordinate represents the amount of retained energy Ec in each of the catalyst bodies. Here, note that the amount Ec of retained energy referred to herein is an average value of the amount of energy retained by each catalyst body during a period of time until the temperature of the exhaust gas discharged from the internal combustion engine 10 goes up to raise the temperatures of the first catalyst body 3 and the second catalyst body 4 to the required temperature or above with the heat supplied thereto from the exhaust gas, after the cold starting of the internal combustion engine 10. In addition, in FIG. 4, the axis of abscissa represents the heat capacity Ch1 of the first catalyst body 3, and the heat capacity Ch2 of the second catalyst body 4. In FIG. 4, the left end shows a state in which the heat capacity Ch1 of the first catalyst body 3 is substantially zero, and the right end shows a state in which the heat capacity Ch2 of the second catalyst body 4 is substantially zero. Here, note that, as mentioned above, in general, the first catalyst body 3 and the second catalyst body 4 are in a relation such that when the heat capacity of one of them becomes large, the heat capacity of the other becomes small. For that reason, the relation in FIG. 4 depends on the assumption that the sum of the heat capacity Ch1 of the first catalyst body 3 and the heat capacity Ch2 of the second catalyst body 4 is constant. In addition, the relation in FIG. 4 depends on the assumption that the amount of energy to be supplied to the first catalyst body 3 as electric power before the starting of the internal combustion engine 1 is constant.

In FIG. 4, a broken line shows the relation between the heat capacity Ch1 and the amount of retained energy Ec in the first catalyst body 3, and an alternate long and short dash line shows the relation between the heat capacity Ch2 and the amount of retained energy Ec in the second catalyst body 4. In addition, in FIG. 4, a solid line shows the sum of the retained energy of the first catalyst body 3, and the retained energy of the second catalyst body 4. As shown in FIG. 4, in each of the first catalyst body 3 and the second catalyst body 4, the amount of retained energy thereof increases, as the heat capacity thereof is larger. Then, in view of the fact that the first catalyst body 3 and the second catalyst body 4 are such that when the heat capacity of one of them becomes large, the heat capacity of the other becomes small, the sum of the retained energy of the first catalyst body 3 and the retained energy of the second catalyst body 4 becomes the largest in a range indicated by hatched lines in FIG. 4. In other words, the sum of the retained energy of the first catalyst body 3 and the retained energy of the second catalyst body 4 becomes the largest in the range in which the ratio between the heat capacity of the first catalyst body 3 and the heat capacity of the second catalyst body 4 is in the vicinity of equivalence, and in which the ratio of the heat capacity of the second catalyst body 4 with respect to the heat capacity of the first catalyst body 4 is in a range of 0.67-1.5. Accordingly, by putting the ratio of the heat capacity of the second catalyst body 4 with respect to the heat capacity of the first catalyst body 3 within this range, it becomes possible to most efficiently utilize the energy supplied to the first catalyst body 3 as electric power before the starting of the internal combustion engine 10 for exhaust gas purification or reduction in the entire EHC 1 after the starting of the internal combustion engine 1. Accordingly, the EHC 1 according to this embodiment is configured such that the ratio of the heat capacity of the second catalyst body 4 with respect to the heat capacity of the first catalyst body 3 becomes within the range of 0.67-1.5.

(Ratio of the Amounts of Coat of the OSC Materials)

Next, reference will be made to the ratio between the amount of coat of the OSC material in the first catalyst body 3 and the amount of coat of the OSC material in the second catalyst body 4. In each of the first catalyst body 3 and the second catalyst body 4, not only the substrates 31, 41 but also the OSC materials coated thereon have a certain amount of heat capacity. For that reason, the ratio between the heat capacity of the first catalyst body 3 and the heat capacity of the second catalyst body 4 is not the ratio of the heat capacities of the individual substrates 31, 41 alone, but is the ratio between the heat capacities thereof in a state including the OSC materials coated thereon (i.e., the ratio the heat capacities of the substrate and the OSC material coated thereon of the first catalyst body 3 and those of the second catalyst body 4). Here, note that the heat capacity of the noble metal supported by each of the first catalyst body 3 and the second catalyst body 4 is very small, and hence, substantially no influence is exerted to the heat capacity in each of the catalyst bodies 3, 4 as a whole. Accordingly, in general, the ratio of the amount of coat of the OSC material in the second catalyst body 4 with respect to the amount of coat of the OSC material in the first catalyst body 3 becomes equal to the ratio of the heat capacity of the second catalyst body 4 with respect to the heat capacity of the first catalyst body 3. However, as mentioned above, the EHC 1 according to this embodiment is configured such that the ratio of the heat capacity of the second catalyst body 4 with respect to the heat capacity of the first catalyst body 3 is made within the range of 0.67-1.5, and at the same time, the ratio of the amount of coat of the OSC material in the second catalyst body 4 with respect to the amount of coat of the OSC material in the first catalyst body 3 is made larger than the ratio of the heat capacity of the second catalyst body 4 with respect to the heat capacity of the first catalyst body 3.

Here, assuming that the heat capacity of the first catalyst body 3 as a whole is made constant, the heat capacity of the OSC material in the first catalyst body 3 decreases, as the amount of coat of the OSC material in the first catalyst body 3 is smaller, and hence, the heat capacity of the first substrate 31 will be made larger, i.e., the volume of the first substrate 31 will be made larger. Then, the larger the volume of the first substrate 31, the larger the surface area of the first catalyst body 3 in contact with the exhaust gas components in the exhaust gas becomes. In other words, the larger the contact area between the first catalyst body 3 and the exhaust gas becomes. As a result, the amount of heat obtained by the reaction of the exhaust gas components in the first catalyst body 3 after the starting of the internal combustion engine 10 becomes larger.

As mentioned above, when the ratio of the amount of coat of the OSC material in the second catalyst body 4 with respect to the amount of coat of the OSC material in the first catalyst body 3 is made larger than the ratio of the heat capacity of the second catalyst body 4 with respect to the heat capacity of the first catalyst body 3, the volume of the first substrate 31 of the first catalyst body 3 will be made larger, while maintaining the heat capacity of the first catalyst body 3, in comparison with the case where the ratio of the amount of coat of the OSC material in the second catalyst body 4 with respect to the amount of coat of the OSC material in the first catalyst body 3 is made equal to the ratio of the heat capacity of the second catalyst body 4 with respect to the heat capacity of the first catalyst body 3. For that reason, the amount of heat obtained by the reaction of the exhaust gas components increases in the first catalyst body 3 which is in a state where the required temperature Tct has been reached, immediately after the starting of the internal combustion engine 10.

Thus, when the amount of heat obtained by the reaction of the exhaust gas components in the first catalyst body 3 after the starting of the internal combustion engine 1 increases in this manner, even if the supply of electric power (electrical energization) to the first catalyst body 3 is stopped at the time when the internal combustion engine 1 is started, the temperature of the first catalyst body 3 becomes difficult to drop after that. Accordingly, the state where the temperature of the first catalyst body 3 is equal to or higher than the required temperature Tct after the starting of the internal combustion engine 1 becomes easy to be maintained for a longer period of time. For that reason, it becomes more difficult for the situation to occur in which the temperatures of the first catalyst body 3 and the second catalyst body 4 are each less than the required temperature Tct. In other words, the EHC 1 becomes easier to exhibit the required exhaust gas purification performance.

Figure 5:
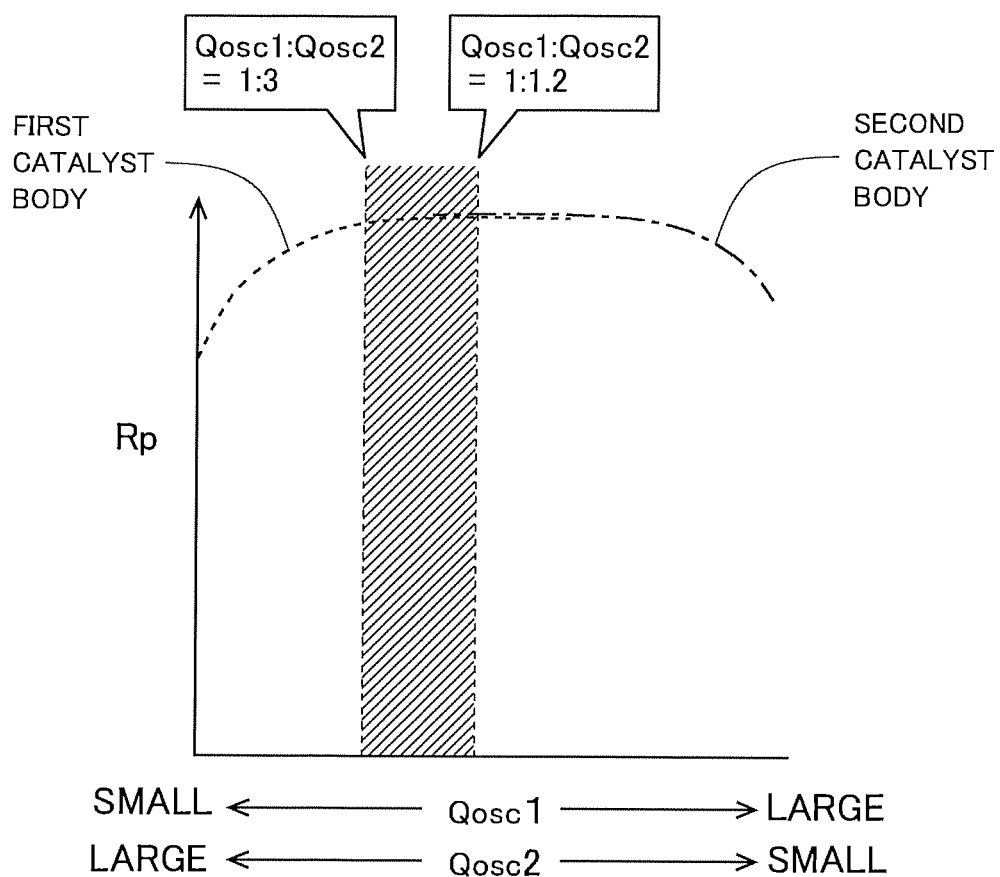
FIG. 5 is a view showing the relation between amounts of coat of OSC materials and exhaust gas purification (reduction) rates, in the first catalyst body and the second catalyst body, according to the embodiments of the present disclosure.

Here, reference will be made to a specific example of the ratio between the amount of coat of the OSC material in the first catalyst body 3 and the amount of coat of the OSC material in the second catalyst body 4, based on FIG. 5. FIG. 5 is a view showing the relation between amounts of coat of OSC materials and exhaust gas purification (reduction) rates, in the first catalyst body 3 and the second catalyst body 4. In FIG. 5, the axis of ordinate represents the exhaust gas purification rates Rp in the catalyst bodies. Here, note that the exhaust gas purification rates Rp here are not the exhaust gas purification rates in a state where the catalyst bodies are new products, but the exhaust gas purification rates at a constant predetermined temperature (e.g., 450 degrees C.) of the catalyst bodies in a state where they have been used for a predetermined period of time (i.e., in a state where deterioration of the catalyst bodies with time has progressed to some extent). In addition, in FIG. 5, the axis of abscissa represents the amount of coat Qosc1 of the OSC material in the first catalyst body 3, and the amount of coat Qosc2 of the OSC material in the second catalyst body 4. Here, note that, as mentioned above, the first catalyst body 3 and the second catalyst body 4 are also in a relation such that when the amount of coat of the OSC material of one of them increases, the amount of coat of the OSC material of the other decreases. For that reason, the relations in FIG. 5 are based on the assumption that the sum of the amount of coat Qosc1 of the OSC material in the first catalyst body 3 and the amount of coat Qosc2 of the OSC material in the second catalyst body 4 is constant or fixed.

In FIG. 5, a broken line shows the relation between the amount of coat Qosc1 of the OSC material in the first catalyst body 3 and the exhaust gas purification rate Rp, and an alternate long and short dash line shows the relation between the amount of coat Qosc2 of the OSC material in the second catalyst body 4 and the exhaust gas purification rate Rp. In the catalyst bodies, when the amounts of coat of the OSC materials are too small, the noble metals may be easily oxidized, so that deterioration thereof is easy to be promoted. Therefore, as shown in FIG. 5, in each of the first catalyst body 3 and the second catalyst body 4, the exhaust gas purification rate Rp is low in a range in which the amount of coat Qosc1 or Qosc2 of the OSC material is small. On the other hand, in a range indicated by hatched lines in FIG. 5, the exhaust gas purification rate Rp in any of the first catalyst body 3 and the second catalyst body 4 is high. In other words, in this hatched range in FIG. 5, the degree of deterioration in any of the first catalyst body 3 and the second catalyst body 4 is small. As mentioned above, considering such a point, in addition to that the ratio of the amount of coat Qosc2 of the OSC material in the second catalyst body 4 with respect to the amount of coat Qosc1 of the OSC material in the first catalyst body 3 is made larger than the ratio of the heat capacity of the second catalyst body 4 with respect to the heat capacity of the first catalyst body 3, which is a ratio in the vicinity of equivalence, it is preferable that the ratio of the amount of coat Qosc2 of the OSC material in the second catalyst body 4 with respect to the amount of coat Qosc1 of the OSC material in the first catalyst body 3 be made within the range indicated by the hatched lines in FIG. 5. In other words, it is preferable that the ratio of the amount of coat Qosc2 of the OSC material in the second catalyst body 4 with respect to the amount of coat Qosc1 of the OSC material in the first catalyst body 3 be made within a range of 1.2-3. By making the ratio of the amount of coat Qosc2 of the OSC material in the second catalyst body 4 with respect to the amount of coat Qosc1 of the OSC material in the first catalyst body 3 within the above-mentioned range, it is possible to make it difficult to promote the deterioration of the individual catalyst bodies 3, 4.

However, the range of the ratio of the amounts of coat of the OSC materials in each of the catalyst bodies 3, 4 indicated by the hatched lines in FIG. 5 is an example, after all, and this ratio is not limited to values within that range. For example, the range of the ratio of the amount of coat of the OSC material in the second catalyst body 4 with respect to the amount of coat of the OSC material in the first catalyst body 3 may be set within a range of values larger than a maximum value (i.e., 1.5) in the range of the ratio of the heat capacity of the second catalyst body 4 with respect to the heat capacity of the first catalyst body 3. In this case, the ratio of the amount of coat of the OSC material in the second catalyst body 4 with respect to the amount of coat of the OSC material in the first catalyst body 3 may be set within a range of 1.6-3.

(Ratio of the Amounts of Support of the Noble Metals)

Next, reference will be made to the ratio between the amount of support of the noble metal in the first catalyst body 3 and the amount of support of the noble metal in the second catalyst body 4. In general, an OSC material and a noble metal are coated to a substrate at the same time in the production process of a catalyst body, and hence, the ratio of the amount of support of the noble metal in the second catalyst body 4 with respect to the amount of support of the noble metal in the first catalyst body 3 becomes equivalent to the ratio of the amount of coat of the OSC material in the second catalyst body 4 with respect to the amount of coat of the OSC material in the first catalyst body 3. However, as mentioned above, the EHC 1 according to this embodiment is configured such that the ratio of the heat capacity of the second catalyst body 4 with respect to the heat capacity of the first catalyst body 3 becomes within the range of 0.67-1.5, and at the same time, contrary to the ratio of the amount of coat of the OSC material in the second catalyst body 4 with respect to the amount of coat of the OSC material in the first catalyst body 3, the ratio of the amount of support of the noble metal in the second catalyst body 4 with respect to the amount of support of the noble metal in the first catalyst body 3 becomes smaller than the ratio of the heat capacity of the second catalyst body 4 with respect to the heat capacity of the first catalyst body 3.

Here, as mentioned above, in the EHC 1, by the electrical energization to the first catalyst body 3 immediately before the starting of the internal combustion engine 10, the first catalyst body 3 is made in a state where the temperature thereof has been raised to the required temperature Tct or above, at the time when the internal combustion engine 10 is started. Then, during a period of time until the temperature of the second catalyst body 4 reaches the required temperature Tct immediately after the starting of the internal combustion engine 10, it is required to ensure the desired exhaust gas purification (reduction) rate by means of only the first catalyst body 3, which is in a state where the temperature thereof has been raised to the required temperature Tct or above. In addition, in the EHC 1, the first catalyst body 3 is arranged at the upstream side of the second catalyst body 4. For that reason, when the internal combustion engine 10 is in operation and the exhaust gas flows through the exhaust pipe 2, the first catalyst body 3 easily receives the heat of the exhaust gas flowing into the EHC 1, in comparison with the second catalyst body 4. Accordingly, in the EHC 1, deterioration of the first catalyst body 3 progresses easily in comparison with that of the second catalyst body 4.

At this time, as mentioned above, when the ratio of the amount of support of the noble metal in the second catalyst body 4 with respect to the amount of support of the noble metal in the first catalyst body 3 is made smaller than the ratio of the heat capacity of the second catalyst body 4 with respect to the heat capacity of the first catalyst body 3, the exhaust gas purification performance of the first catalyst body 3 alone can be made higher, while maintaining the heat capacity of the first catalyst body 3, in comparison with the case where the ratio of the amount of support of the noble metal in the second catalyst body 4 with respect to the amount of support of the noble metal in the first catalyst body 3 is made equivalent to the ratio of the heat capacity of the second catalyst body 4 with respect to the heat capacity of the first catalyst body 3. Accordingly, in a situation where it is immediately after the starting of the internal combustion engine 10 and it is required to ensure the desired exhaust gas purification rate only by the first catalyst body 3, it becomes easier to ensure the desired exhaust gas purification rate. In other words, in the first catalyst body 3, it becomes possible to ensure the desired exhaust gas purification rate even at a lower temperature. For that reason, it also becomes possible to lower the required temperature to the first catalyst body 3. In this case, it is possible to decrease the electric energy to be supplied to the first catalyst body 3 before the starting of the internal combustion engine 10. In addition, even in cases where deterioration of the first catalyst body 3 with time has progressed resulting from its exposure to the exhaust gas, it becomes easy to ensure the desired exhaust gas purification rate.

Figure 6:
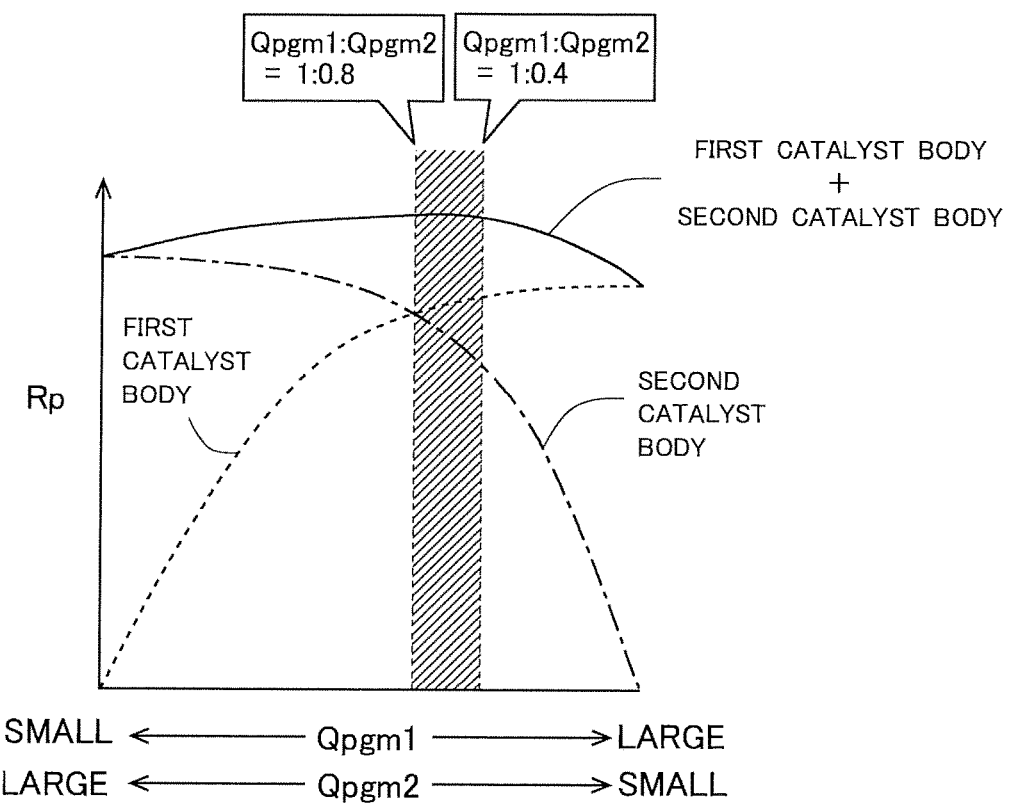
FIG. 6 is a view showing the relation between amounts of support of noble metals and exhaust gas purification (reduction) rates, in the first catalyst body and the second catalyst body, according to the embodiments of the present disclosure.

Here, reference will be made to a specific example of the ratio between the amount of support of the noble metal in the first catalyst body 3 and the amount of support of the noble metal in the second catalyst body 4, based on FIG. 6. FIG. 6 is a view showing the relation between amounts of support of the noble metals and exhaust gas purification (reduction) rates, in the first catalyst body 3 and the second catalyst body 4. In FIG. 6, the axis of ordinate represents the exhaust gas purification rates Rp in the catalyst bodies. Here, note that, similar to FIG. 5, the exhaust gas purification rates Rp here are not the exhaust gas purification rates in a state where the catalyst bodies are new products, but the exhaust gas purification rates at a constant predetermined temperature (e.g., 450 degrees C.) of the catalyst bodies in a state where they have been used for a predetermined period of time (i.e., in a state where deterioration of the catalyst bodies with time has progressed to some extent). In addition, in FIG. 6, the axis of abscissa represents the amount of support Qpgm1 of the noble metal in the first catalyst body 3, and the amount of support Qpgm2 of the noble metal in the second catalyst body 4. In FIG. 6, the left end shows a state in which the amount of support Qpgm1 of the noble metal in the first catalyst body 3 is substantially zero, and the right end shows a state in which the amount of support Qpgm2 of the noble metal in the second catalyst body 4 is substantially zero. Here, note that the first catalyst body 3 and the second catalyst body 4 are in a relation such that when the amount of support of the noble metal of one of them increases, the amount of support of the noble metal of the other decreases, as mentioned above. For that reason, the relations in FIG. 6 are based on the assumption that the sum of the amount of support Qpgm1 of the noble metal in the first catalyst body 3 and the amount of support Qpgm2 of the noble metal in the second catalyst body 4 is constant or fixed.

In FIG. 6, a broken line shows the relation between the amount of support Qpgm1 of the noble metal in the first catalyst body 3 and the exhaust gas purification rate Rp, and an alternate long and short dash line shows the relation between the amount of support Qpgm2 of the noble metal in the second catalyst body 4 and the exhaust gas purification rate Rp. In addition, in FIG. 6, a solid line shows the exhaust gas purification rate Rp in the total of the first catalyst body 3 and the second catalyst body 4. As shown in FIG. 6, in each of the first catalyst body 3 and the second catalyst body 4, the exhaust gas purification rate Rp becomes higher, as the amount of support of the noble metal is larger. Then, in view of the fact that the first catalyst body 3 and the second catalyst body 4 are such that when the amount of support of the noble metal in one of them increases, the amount of support of the noble metal in the other decreases, the exhaust gas purification rate Rp in the total of the first catalyst body 3 and the second catalyst body 4 becomes relatively large in a range indicated by hatched lines in FIG. 6.

As described above, there is a case where it becomes necessary to ensure the desired exhaust gas purification rate only by the first catalyst body 3, immediately after the starting of the internal combustion engine 10. For that reason, it is necessary for the first catalyst body 3 to support at least a certain amount of noble metal in which the desired exhaust gas purification rate can be ensured only by the first catalyst body 3. In addition, it is necessary to ensure the exhaust gas purification rate as high as possible in the total of the first catalyst body 3 and the second catalyst body 4, too. As mentioned above, considering such a point, in addition to that the ratio of the amount of support Qpgm2 of the noble metal in the second catalyst body 4 with respect to the amount of support Qpgm1 of the noble metal in the first catalyst body 3 is made smaller than the ratio of the heat capacity of the second catalyst body 4 with respect to the heat capacity of the first catalyst body 3, which is a ratio in the vicinity of equivalence, it is preferable that the ratio of the amount of support Qpgm2 of the noble metal in the second catalyst body 4 with respect to the amount of support Qpgm1 of the noble metal in the first catalyst body 3 be made within the range indicated by the hatched lines in FIG. 6. In other words, it is preferable that the ratio of the amount of support Qpgm2 of the noble metal in the second catalyst body 4 with respect to the amount of support Qpgm1 of the noble metal in the first catalyst body 3 be set within a range of 0.4-0.8. Thus, by setting the ratio of the amount of support Qpgm2 of the noble metal in the second catalyst body 4 with respect to the amount of support Qpgm1 of the noble metal in the first catalyst body 3 within this range, it becomes possible to achieve a suitable exhaust gas purification rate, both in the case of purifying the exhaust gas by the first catalyst body 3 alone, and in the case of purifying the exhaust gas by both of the first catalyst body 3 and the second catalyst body 4.

However, the range of the ratio of the amounts of support of the noble metals in each of the catalyst bodies 3, 4 indicated by the hatched lines in FIG. 6 is an example, after all, and this ratio is not limited to values within that range. For example, the range of the ratio of the amount of support of the noble metal in the second catalyst body 4 with respect to the amount of support of the noble metal in the first catalyst body 3 may be set within a range of values smaller than a minimum value (i.e., 0.67) in the range of the ratio of the heat capacity of the second catalyst body 4 with respect to the heat capacity of the first catalyst body 3. In this case, the ratio of the amount of support of the noble metal in the second catalyst body 4 with respect to the amount of support of the noble metal in the first catalyst body 3 may be set within a range of 0.4-0.66.

As explained in the foregoing, in the EHC 1 according to this embodiment, the ratio of the heat capacity of the second catalyst body 4 with respect to the heat capacity of the first catalyst body 3 is set within the range of 0.67-1.5, which are ratios in the vicinity of equivalence, and at the same time, the ratio of the amount of coat of the OSC material in the second catalyst body 4 with respect to the amount of coat of the OSC material in the first catalyst body 3 is made larger than the ratio of the heat capacity of the second catalyst body 4 with respect to the heat capacity of the first catalyst body 3, and the ratio of the amount of support of the noble metal in the second catalyst body 4 with respect to the amount of support of the noble metal in the first catalyst body 3 is made smaller than the ratio of the heat capacity of the second catalyst body 4 with respect to the heat capacity of the first catalyst body 3, whereby the exhaust gas purification (reduction) performance required to the EHC 1 can be exhibited in a more suitable manner.

What is claimed is:

1. An electrically heated catalyst which is arranged in an exhaust passage of an internal combustion engine, and in which a first catalyst body and a second catalyst body, each of which is formed by coating on a substrate an OSC material which is a coating material having an oxygen retaining capacity, and by supporting a noble metal on the substrate, are received in the same case, in which said second catalyst body is arranged at the downstream side of said first catalyst body and the substrate of said first catalyst body is electrically energized to generate heat,
   wherein a ratio of a heat capacity of said second catalyst body with respect to a heat capacity of said first catalyst body is within a range of 0.67-1.5;
   a ratio of an amount of coat of the OSC material in said second catalyst body with respect to an amount of coat of the OSC material in said first catalyst body is larger than the ratio of the heat capacity of said second catalyst body with respect to the heat capacity of said first catalyst body; and
   a ratio of an amount of support of the noble metal in said second catalyst body with respect to an amount of support of the noble metal in said first catalyst body is smaller than the ratio of the heat capacity of said second catalyst body with respect to the heat capacity of said first catalyst body.

2. The electrically heated catalyst as set forth in claim 1, wherein
   the ratio of the amount of coat of the OSC material in said second catalyst body with respect to the amount of coat of the OSC material in said first catalyst body is within a range of 1.2-3.

3. The electrically heated catalyst as set forth in claim 1, wherein
   the ratio of the amount of support of the noble metal in said second catalyst body with respect to the amount of support of the noble metal in said first catalyst body is within a range of 0.4-0.8.

4. The electrically heated catalyst as set forth in claim 2, wherein
   the ratio of the amount of support of the noble metal in said second catalyst body with respect to the amount of support of the noble metal in said first catalyst body is within a range of 0.4-0.8.

* * * * *